United States Patent
Roufoogaran et al.

(10) Patent No.: US 8,270,926 B2
(45) Date of Patent: Sep. 18, 2012

(54) RADIO FRONT END AND APPLICATIONS THEREOF

(75) Inventors: Razieh Roufoogaran, Marina Del Ray, CA (US); Jesus Alfonso Castaneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 1911 days.

(21) Appl. No.: 10/802,014

(22) Filed: Mar. 16, 2004

(65) Prior Publication Data

US 2005/0208917 A1    Sep. 22, 2005

(51) Int. Cl.
*H04B 1/18* (2006.01)

(52) U.S. Cl. ............ 455/292; 455/78; 455/73; 455/293; 330/305

(58) Field of Classification Search .................... 455/78, 455/83, 73, 80, 82, 129, 280, 292, 293, 296, 455/333, 114.2–114.3, 334, 279.1; 330/305, 330/307, 165

See application file for complete search history.

(56) References Cited

U.S. PATENT DOCUMENTS

| | | | | |
|---|---|---|---|---|
| 6,370,245 B1 * | 4/2002 | White | .................. | 379/390.04 |
| 6,466,770 B1 * | 10/2002 | Griffith et al. | .................. | 455/91 |
| 6,721,544 B1 * | 4/2004 | Franca-Neto | .................. | 455/83 |
| 6,735,418 B1 * | 5/2004 | MacNally et al. | .............. | 455/78 |
| 6,768,443 B2 * | 7/2004 | Willis | .......................... | 341/172 |
| 6,819,914 B2 * | 11/2004 | Yan et al. | ...................... | 455/318 |
| 6,844,792 B1 * | 1/2005 | Koeppe et al. | ............. | 333/24 R |
| 6,850,746 B1 * | 2/2005 | Lloyd et al. | .................... | 455/272 |
| 6,895,226 B1 * | 5/2005 | Forster et al. | ................... | 455/86 |
| 6,919,858 B2 * | 7/2005 | Rofougaran | ................. | 343/850 |
| 6,982,609 B1 * | 1/2006 | McKay et al. | ................. | 333/25 |
| 6,999,743 B2 * | 2/2006 | Sabouri et al. | ................ | 455/307 |
| 7,065,327 B1 * | 6/2006 | Macnally et al. | .............. | 455/78 |
| 2003/0048227 A1 * | 3/2003 | Nakamura | .................... | 343/702 |
| 2003/0054791 A1 * | 3/2003 | Sayers | ......................... | 455/338 |
| 2003/0114129 A1 * | 6/2003 | Jerng | ........................... | 455/323 |
| 2004/0014428 A1 * | 1/2004 | Franca-Neto | .................. | 455/73 |
| 2005/0195113 A1 * | 9/2005 | Candal | ......................... | 343/702 |
| 2006/0044080 A1 * | 3/2006 | Hagiwara et al. | ............. | 333/195 |
| 2006/0046681 A1 * | 3/2006 | Bagheri et al. | ............... | 455/333 |
| 2006/0084392 A1 * | 4/2006 | Marholev et al. | .............. | 455/78 |
| 2006/0135084 A1 * | 6/2006 | Lee | ................................. | 455/78 |

* cited by examiner

*Primary Examiner* — Pablo Tran (74) *Attorney, Agent, or Firm* — Garlick & Markison; Timothy W. Markison; Jessica W. Smith (57) ABSTRACT

A radio front end includes a transformer and an adjustable load. The transformer includes a first winding and a second winding, wherein the first winding is operably coupled to an antenna and the second winding coupled to at least one of a power amplifier and a low noise amplifier. The adjustable load is operably coupled to the second winding, wherein the adjustable load provides a first impedance based on a first impedance selection signal when the radio front end is in a transmit mode and provides a second impedance based on a second impedance selection signal when the radio front end is in a receive module such that impedance at the first winding is substantially similar in the transmit mode and in the receive mode.

21 Claims, 7 Drawing Sheets radio front end 85

FIG. 3
radio front end 85

FIG. 4
radio front end 85

FIG. 9
radio front end 85

RADIO FRONT END AND APPLICATIONS THEREOF

BACKGROUND OF THE INVENTION

1. Technical Field of the Invention

This invention relates generally to wireless communication devices and more particularly to radio interfaces of such wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In many wireless applications, a radio transceiver includes one antenna that is shared by the receiver section and the transmitter section. The sharing of the antenna may be achieved by a transmit/receive switch or a transformer balun. In recent advances in the wireless communication art, a transformer balun has been implemented on-chip with the receiver section and the transmitter section. In such an implementation, a single-ended winding of the transformer balun is operably coupled to the antenna, a first differential winding of the transformer balun is operably coupled to the receiver section, and another differential winding of the transformer balun is operably coupled to the transmitter section.

While the benefits of using an on-chip balun are many, there are some issues of concern, which include impedance matching of the loads on the single-ended winding and on the differential winding, efficient energy transfer from the transmitter section to the antenna via the transformer balun, and complexity of implementation. Such issues arise, at least in part, due to the loading of the transformer balun varies depending on whether the transceiver is in a transmit mode or in a receive mode. For example, the input impedance of the low noise amplifier, which is a load on the differential winding, varies by a factor of two or more depending on whether the low noise amplifier is active or inactive. Further, the output impedance of the power amplifier, which is a load on the differential winding, varies depending on whether the power amplifier is active or inactive.

Therefore, a need exists for a radio front end that provides for efficient energy transfer from the transmitter section to the antenna, provides enhanced impedance matching, and reduces the complexity of implementation.

BRIEF SUMMARY OF THE INVENTION

The radio front end of the present invention substantially meets these needs and others. In one embodiment, a radio front end includes a transformer and an adjustable load. The transformer includes a first winding and a second winding, wherein the first winding is operably coupled to an antenna and the second winding coupled to at least one of a power amplifier and a low noise amplifier. The adjustable load is operably coupled to the second winding, wherein the adjustable load provides a first impedance based on a first impedance selection signal when the radio front end is in a transmit mode and provides a second impedance based on a second impedance selection signal when the radio front end is in a receive module such that impedance at the first winding is substantially similar in the transmit mode and in the receive mode.

In another embodiment, a radio front end includes a transformer and an adjustable load. The transformer includes a first winding and a second winding, wherein the first winding is operably coupled to an antenna and the second winding coupled to at least one of a power amplifier and a low noise amplifier. The adjustable load is operably coupled to the first winding, wherein the adjustable load provides a first impedance based on a first impedance selection signal when the radio front end is in a transmit mode and provides a second impedance based on a second impedance selection signal when the radio front end is in a receive module such that impedance at the first winding is substantially similar in the transmit mode and in the receive mode.

DETAILED DESCRIPTION OF THE INVENTION

Figure 1:
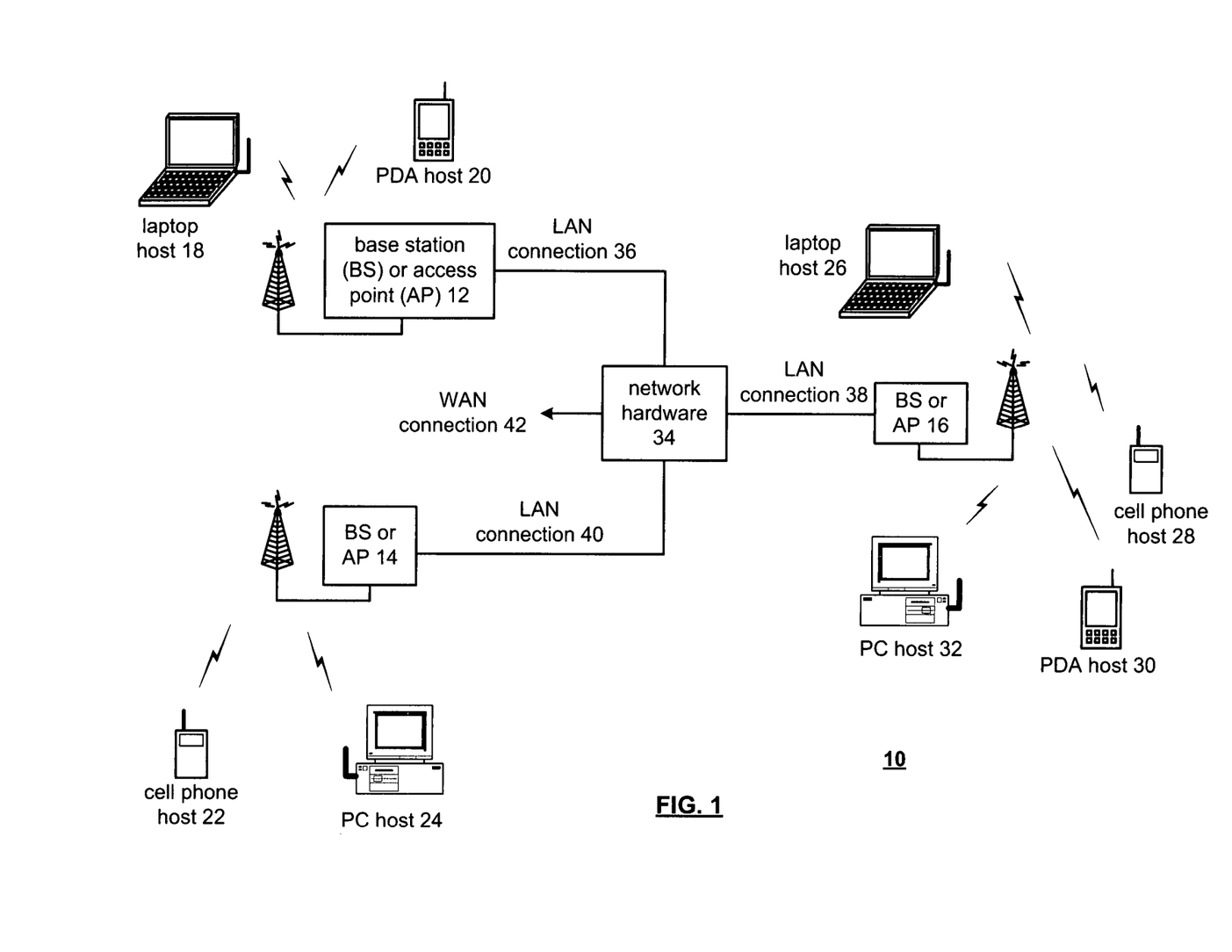
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
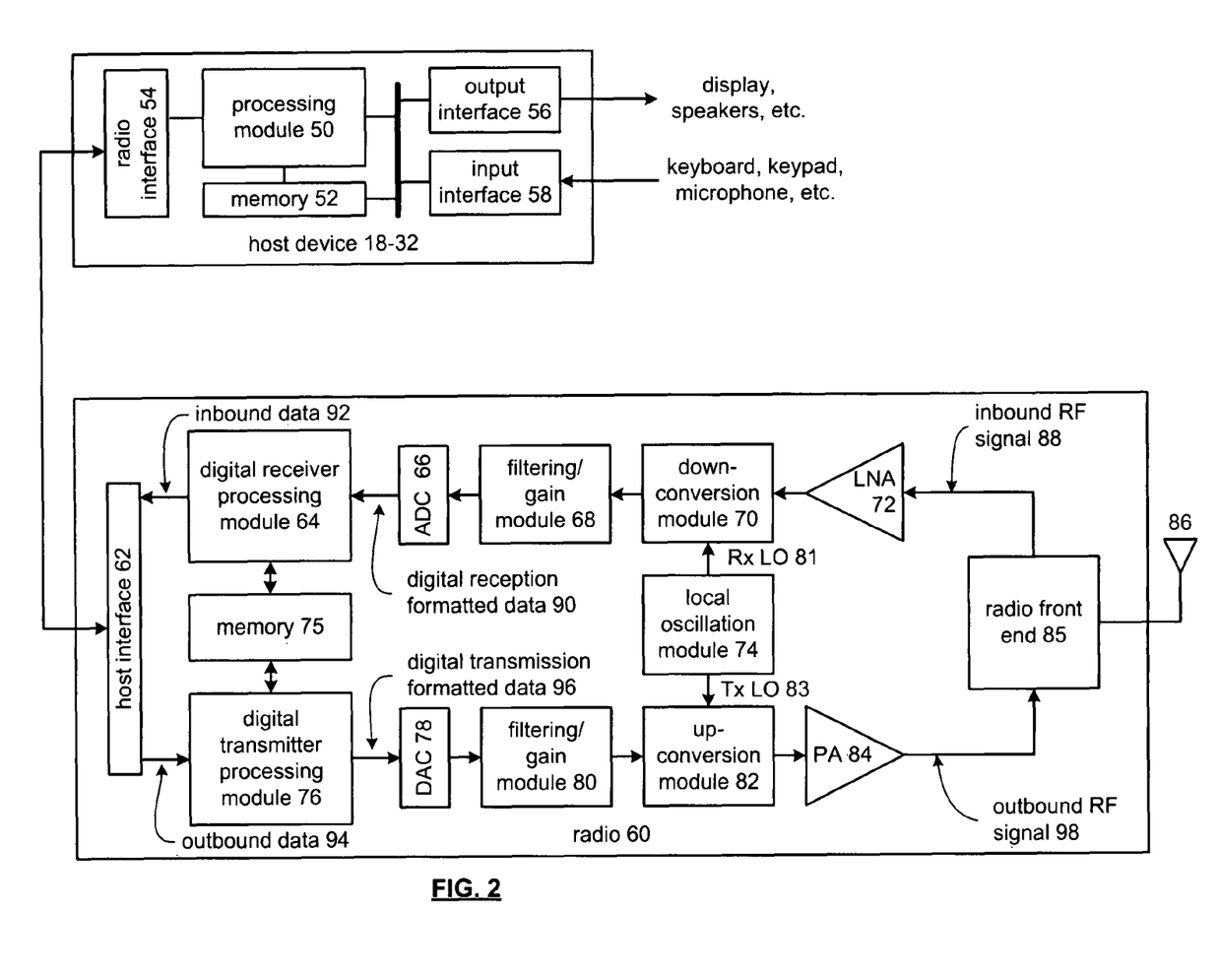
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a low noise amplifier 72, a radio front end 85, a local oscillation module 74, memory 75, a digital transmitter processing module 76, a digital-to-analog converter 78, a filtering/gain module 80, an IF mixing up conversion stage 82, a power amplifier 84, and an antenna 86. The antenna 86 is shared by the transmit and receive paths via the radio front end 85, which will be described in greater detail with reference to FIGS. 3-9.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is provide to the antenna 86 via the radio front end 85, where the antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72 via the radio front end 85. The low noise amplifier 72 amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
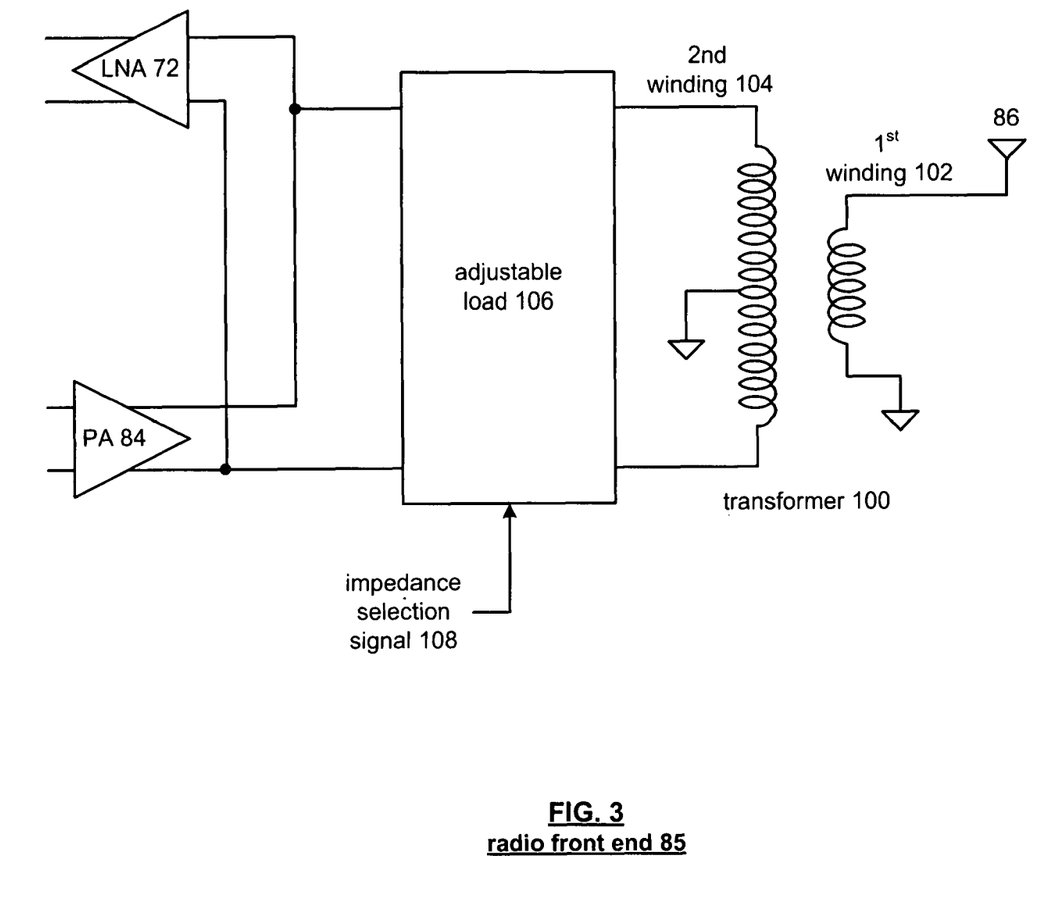
FIG. 3 is a schematic block diagram of a radio front-end in accordance with the present invention.

FIG. 3 is a schematic block diagram of an embodiment of a radio front-end 85 that includes a transformer 100 and an adjustable load 106. The transformer 100 includes a $1^{st}$ winding 102 and a $2^{nd}$ winding 104. The $1^{st}$ winding may be a single-ended winding operably coupled to a circuit ground and to an antenna 86. The $2^{nd}$ winding 104 may be a differential winding having a center tap coupled to circuit ground and the other nodes coupled to the adjustable load 106. The adjustable load 106 is adjusted based on an impedance selection signal 108 and is coupled to the low noise amplifier 72 and power amplifier 84. The adjustable load provides a $1^{st}$ impedance based on the impedance selection signal 108 when the radio front-end is in a transmit mode (i.e., the power amplifier 84 is enabled and low noise amplifier 72 is disabled) and provides a $2^{nd}$ impedance based on the impedance selection signal 108 when the radio front-end is in a receive mode (i.e., the power amplifier 84 is off and the low noise amplifier 72 is on) such that the impedance on the $1^{st}$ winding is substantially similar in the transmit mode and in the receive mode of the radio.

In operation, the loading on the $2^{nd}$ winding 104 varies depending on whether the power amplifier 84 is enabled or the low noise amplifier 72 is enabled. During a calibration function of the wireless communication device, the particular loading during the transmit and receive modes may be determined. Based on this determination, the impedance selection signal 108 may be generated to provide the desired loading of adjustable load 106 such that it provides a $1^{st}$ load during transmit mode and a $2^{nd}$ impedance during receive mode such that the load on the $2^{nd}$ winding 104 remains substantially constant whether the radio is in a transmit mode or receive mode.

Figure 4:
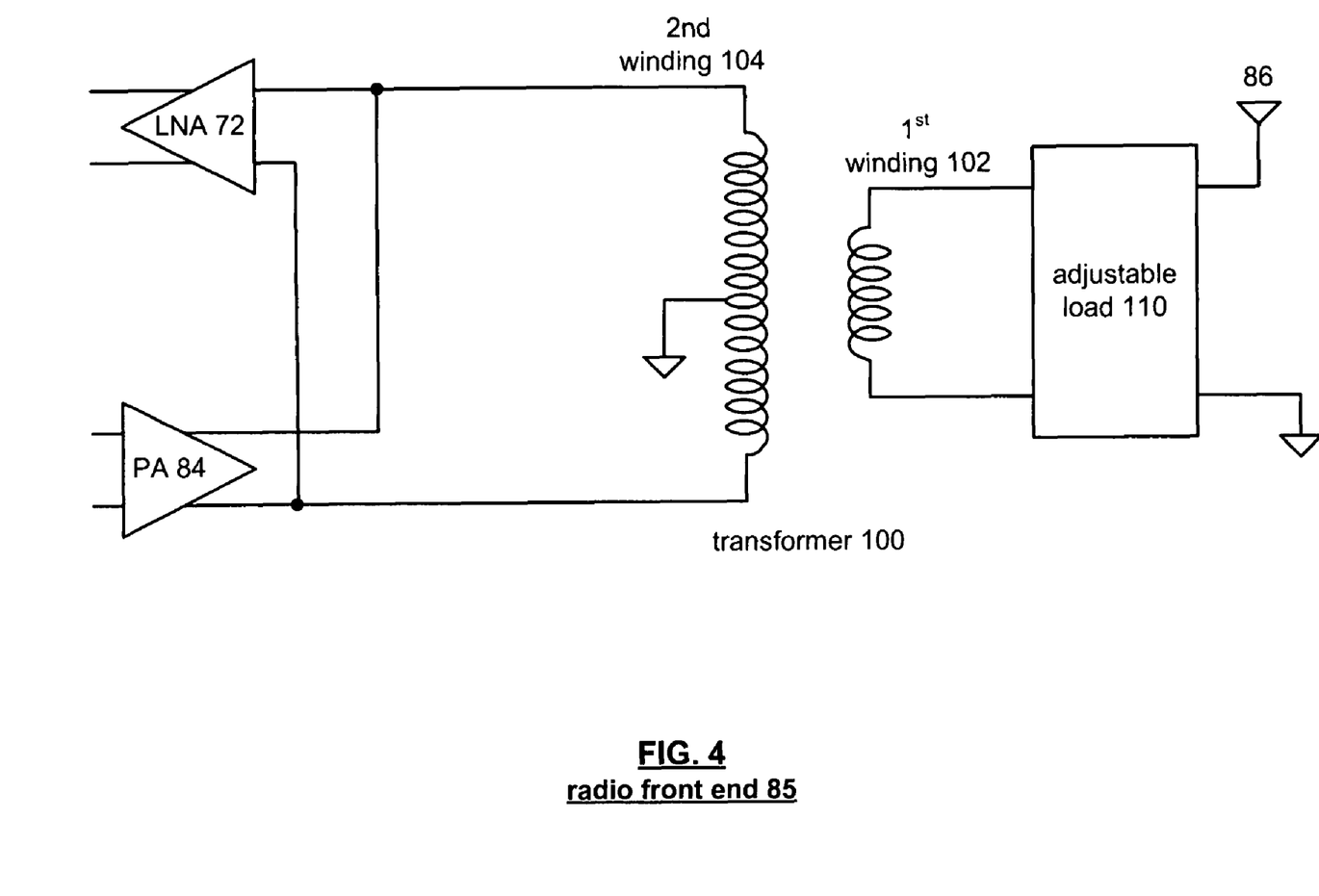
FIG. 4 is a schematic block diagram of another embodiment of a radio front-end in accordance with the present invention.

FIG. 4 is a schematic block diagram of another embodiment of the radio front-end 85. In this embodiment, the radio front-end 85 includes the transformer 100 and an adjustable load 110. In this embodiment, the $2^{nd}$ winding 104 of transformer 100 is directly coupled to the low noise amplifier 72 and power amplifier 84. The $1^{st}$ winding 102 is operably coupled to the adjustable load 110, which is adjusted based on the impedance selection signal 108.

To compensate for the different loading effects on the secondary winding when the low noise amplifier is enabled or the power amplifier is enabled, the adjustable load 110 is adjusted such that the input impedance of the transformer 100 appears substantially constant regardless of whether the radio is in a transmit mode or receive mode. As one of average skill in the art will appreciate, if the antenna 86 has an impedance of approximately 50 OHMS in the frequency range of interest, the input impedance to the radio should substantially equal 50 OHMS. By including the adjustable load 110, and/or adjustable load 106, the input impedance to the radio can remain substantially constant regardless of whether the radio is in a transmit mode or receive mode.

Figure 5:
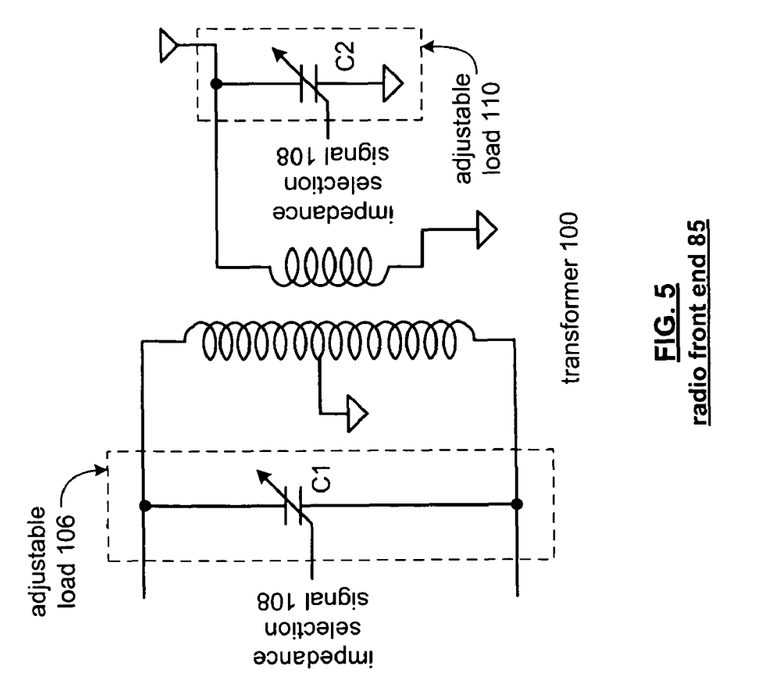
FIG. 5 is a schematic block diagram of yet another embodiment of a radio front-end in accordance with the present invention.

FIG. 5 is a schematic block diagram of yet another embodiment of the radio front-end 85. In this embodiment, the transformer 100 includes the $1^{st}$ and $2^{nd}$ windings, where the $1^{st}$ winding may be coupled to the adjustable load 110 and the $2^{nd}$ winding may be coupled to the adjustable load 106. As one of average skill in the art will appreciate, the radio front-end 85 of FIG. 5 may include one or both of the adjustable loads 106 and/or 110.

In this embodiment, the adjustable load 106 includes a variable capacitor C1 that is coupled across the $2^{nd}$ winding.

The adjustable capacitor C1 may be implemented as a capacitor bank, a varactor or a combination thereof. The control of the variable capacitance C1 is done by the impedance selection signal 108. Similarly, the adjustable load 110 may be implemented using a variable capacitance C2 that is controlled via the impedance selection signal 108. The variable capacitance C2 may be implemented by a capacitor bank and/or a varactor.

Figure 6:
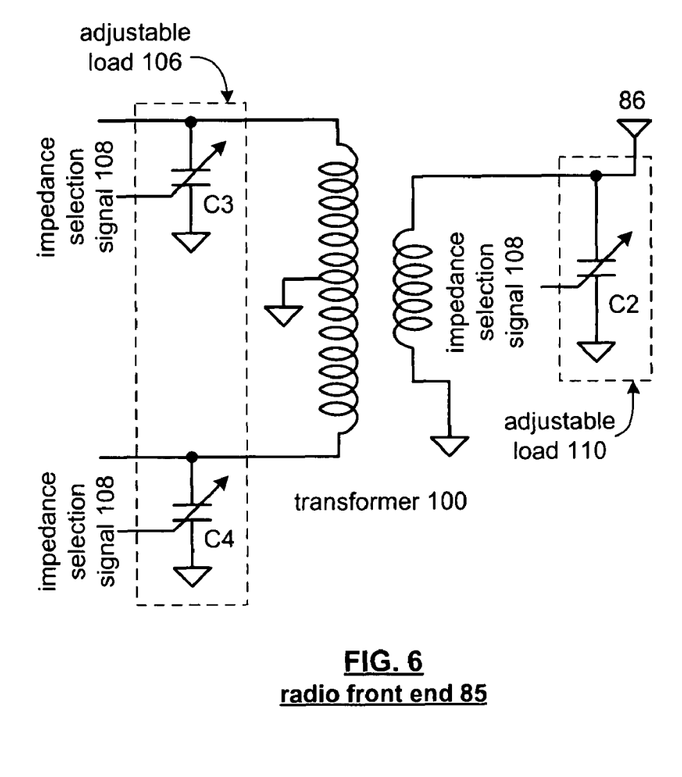
FIG. 6 is a schematic block diagram of a further embodiment of a radio front-end in accordance with the present invention.

FIG. 6 illustrates yet another embodiment of a radio front-end 85 that includes transformer 100 and adjustable load 106 and/or adjustable load 110. In this embodiment, the adjustable load 110 includes the variable capacitor C2.

The adjustable load 106 includes variable capacitors C3 and C4 each of which is coupled to a node of the $2^{nd}$ winding and to circuit ground. Each of capacitors C3 and C4 may be a capacitor bank and/or varactor that is controlled via the impedance selection signal 108.

Figures 7, 8:
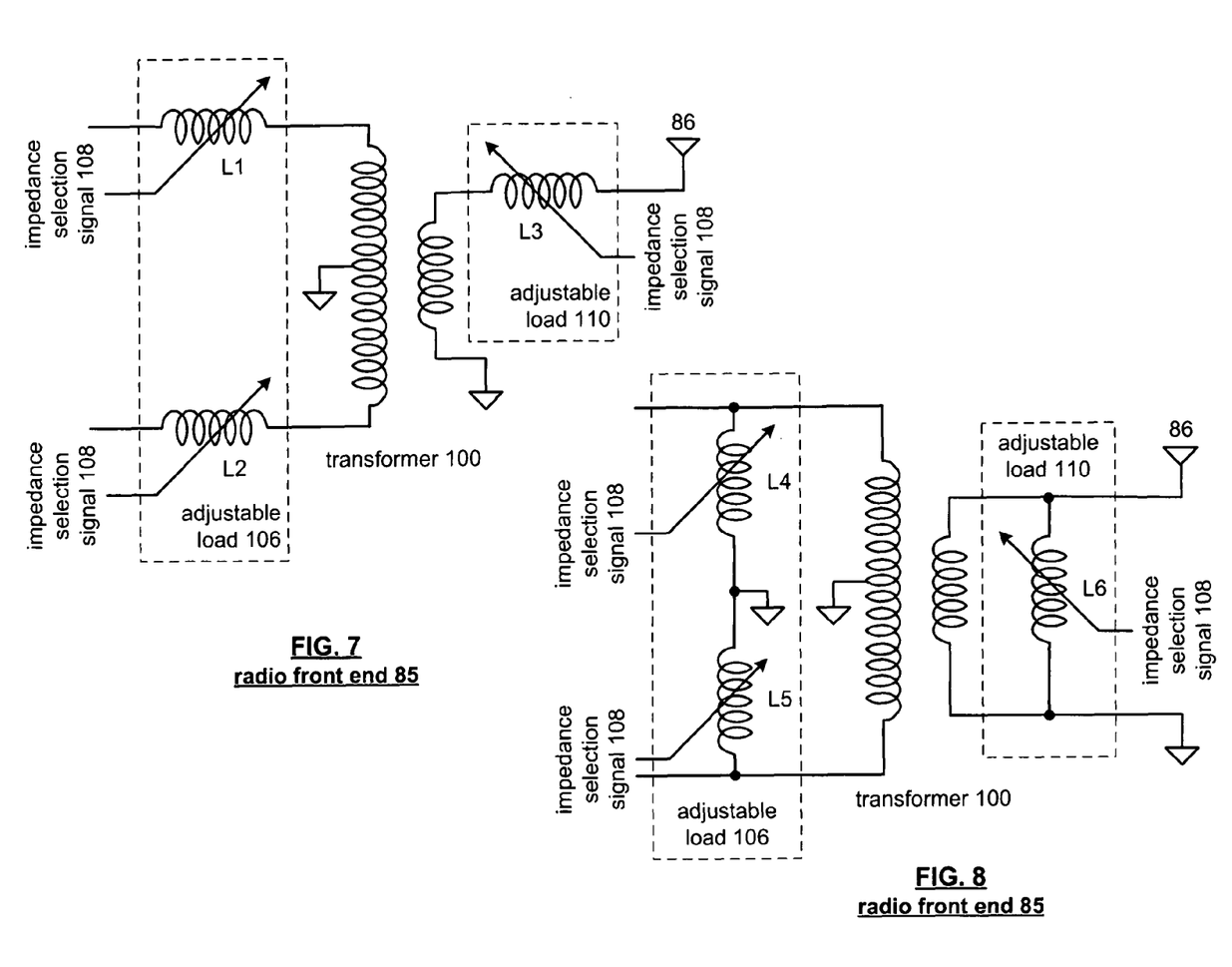
FIG. 7 is a schematic block diagram of a still further embodiment of a radio front-end in accordance with the present invention.
FIG. 8 is a schematic block diagram of yet another embodiment of a radio front-end in accordance with the present invention.

FIG. 7 is a schematic block diagram of a further embodiment of the radio front-end 85 that includes transformer 100 and adjustable load 106 and/or adjustable load 110. In this embodiment, the adjustable loads 106 and 110 include variable inductors $L_1$, $L_2$ and $L_3$ coupled in series with the corresponding windings. The adjustable inductors $L_1$-$L_3$ may be implemented using an inductor bank that is controlled by the impedance selection signal. Accordingly, by adjusting the inductance added in series with the windings of transformer 100, the corresponding input impedance of the radio may be controlled such that it remains substantially constant whether the radio is in a transmit mode or receive mode.

FIG. 8 is a schematic block diagram of a still further embodiment of the radio front-end 85 that includes transformer 100 and adjustable loads 106 and/or adjustable load 110. In this embodiment, the adjustable loads 106 and 110 include variable shunt inductors $L_4$-$L_6$ that are controlled via the input selection signal 108. The inductors $L_4$-$L_6$ may be a inductor bank.

Figure 9:
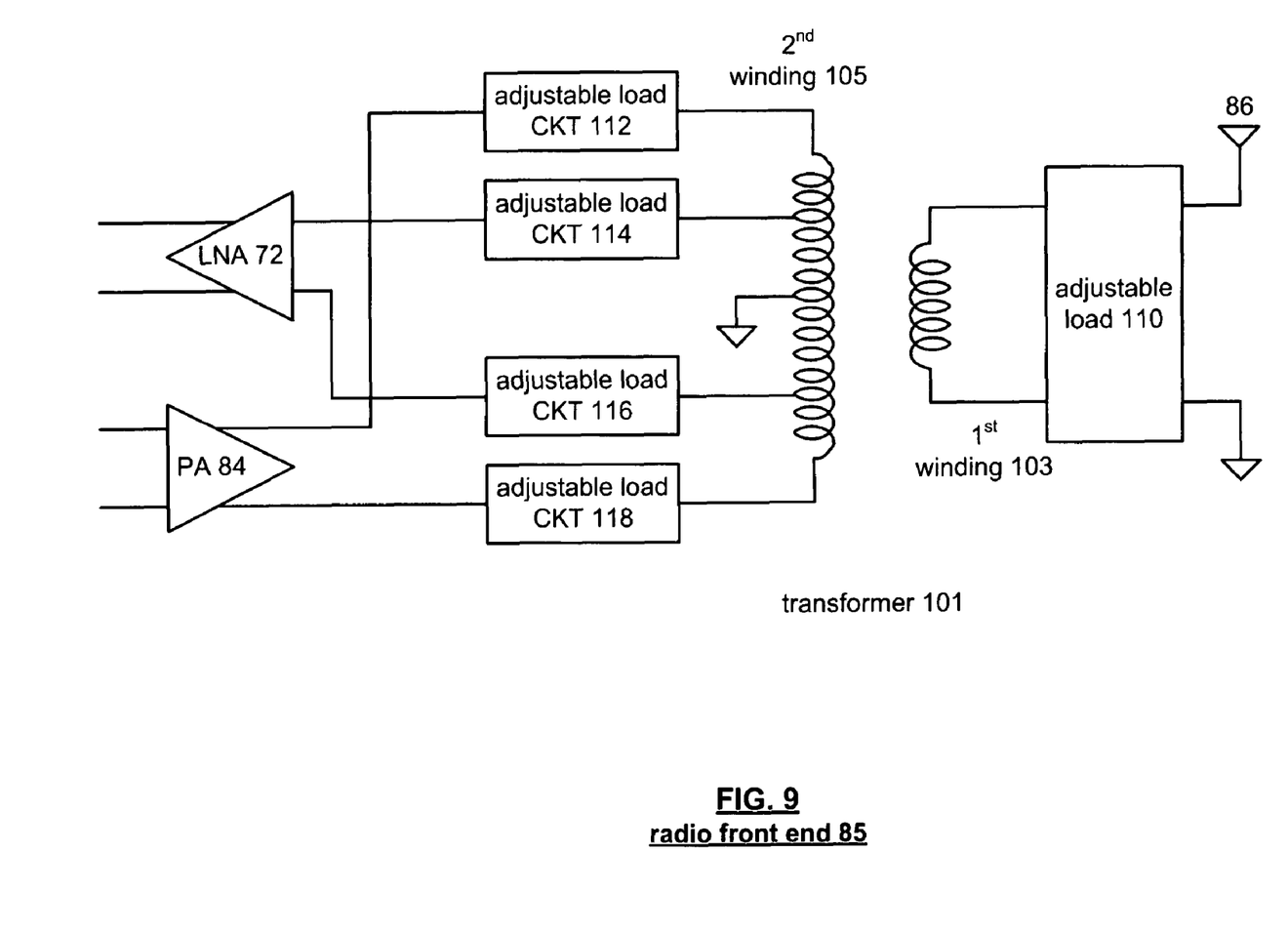
FIG. 9 is a schematic block diagram of a still further embodiment of a radio front-end in accordance with the present invention.

FIG. 9 illustrates yet another embodiment of a radio front-end 85. In this embodiment, transformer 101 includes a $1^{st}$ winding 103 and a $2^{nd}$ winding 105. The $1^{st}$ winding 103 is coupled to the adjustable load 110, which may be implemented in any one of the previous FIGS. 5-8.

The $2^{nd}$ winding 105 includes a center tap operably coupled to circuit ground, a $1^{st}$ pair of windings and a $2^{nd}$ pair of windings. The $1^{st}$ paid of windings has its nodes coupled to the adjustable load circuit 114 and adjustable load circuit 116, which are in turn, coupled to the low noise amplifier 72. The $2^{nd}$ pair of windings has their nodes coupled to adjustable load circuits 112 and 118 which in turn are coupled to power amplifier 84. In this embodiment, the adjustable load circuits 112-118 may be implemented as previously described with reference to FIGS. 5-8.

As one of average skill in the art will appreciate, the values of the capacitors and/or inductors used in the adjustable loads and/or load circuits depends on the load variations induced by the low noise amplifier 72 and power amplifier 84, the inductance of transformer 101 and the operating frequency of the receive and/or transmitted RF signals. For instance, the capacitance values may range from a few hundredths of pico-farads to tens of pico-farads where the inductance may range from a few hundredths of nano-farads to a few nano-farads.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a radio front-end that includes a substantially constant input impedance regardless of whether a radio is in a transmit mode or receive mode. As one of average skill in the art will appreciate, other embodiments may be derived from the teaching of the present invention without deviating from the scope of the claims.

What is claimed is:

1. A radio front end comprises:
a transformer having a first winding and a second winding, wherein the first winding is operably coupled to an antenna and the second winding is operably coupled to a power amplifier and a low noise amplifier, wherein the power amplifier is enabled when the radio front end is in a transmit mode and the low noise amplifier is enabled when the radio front end is in a receive mode; and
an adjustable load operably coupled to the second winding to compensate for differing loads on the second winding in transmit mode when the power amplifier is enabled and receive mode when the low noise amplifier is enabled, wherein the adjustable load is operable to provide a first impedance based on a first impedance selection signal when the radio front end is in a transmit mode and the power amplifier is enabled and provides a second different impedance based on a second impedance selection signal when the radio front end is in a receive mode and the low noise amplifier is enabled such that impedance at the first winding is substantially similar in the transmit mode when the power amplifier is enabled and in the receive mode when the low noise amplifier is enabled.

2. The radio front end of claim 1, wherein the adjustable load comprises:
a first variable capacitor circuit operably coupled from one node of the second winding to a circuit ground, wherein the first variable capacitor circuit provides a first capacitance value in response to the first impedance selection signal and provides a second capacitance value in response to the second impedance selection signal; and
a second variable capacitor circuit operably coupled from another node of the second winding to the circuit ground, wherein the second variable capacitor circuit provides the first capacitance value in response to the first impedance selection signal and provides the second capacitance value in response to the second impedance selection signal.

3. The radio front end of claim 1, wherein the adjustable load comprises:
a variable capacitor circuit operably coupled from a first node of the second winding to a second node of the second winding, wherein the variable capacitor circuit provides a first capacitance value in response to the first impedance selection signal and provides a second capacitance value in response to the second impedance selection signal.

4. The radio front end of claim 1, wherein the adjustable load comprises:
a first variable inductor circuit operably coupled in series with one node of the second winding, wherein the first variable inductor circuit provides a first inductance value in response to the first impedance selection signal and provides a second inductance value in response to the second impedance selection signal; and
a second variable inductor circuit operably coupled in series with another node of the second winding, wherein the second variable inductor circuit provides the first inductance value in response to the first impedance selection signal and provides the second inductance value in response to the second impedance selection signal.

5. The radio front end of claim 1, wherein the adjustable load comprises:
a first variable inductance circuit operably coupled from one node of the second winding to a circuit ground, wherein the first variable inductance circuit provides a first inductance value in response to the first impedance selection signal and provides a second inductance value in response to the second impedance selection signal; and
a second variable inductor circuit operably coupled from another node of the second winding to the circuit ground, wherein the second variable inductor circuit provides the first inductance value in response to the first impedance selection signal and provides the second inductance value in response to the second impedance selection signal.

6. The radio front end of claim 1 further comprises:
determining the load impedance selection signal based on at least one of: impedance matching of load on single-ending winding, output power requirements, and receiver sensitivity.

7. The radio front end of claim 1 further comprises:
the second winding of the transformer includes a first set of taps and a second set of taps, wherein the first set of taps is coupled to a low noise amplifier and the second set of taps is coupled to a power amplifier; and
wherein the adjustable load includes:
a first adjustable load circuit operably coupled to one tap of the first set of taps, wherein the first adjustable load circuit provides a first portion of the first impedance in response to the first impedance selection signal and provides a first portion of the second impedance in response to the second impedance selection signal;
a second adjustable load circuit operably coupled to a second tap of the first set of taps, wherein the second adjustable load circuit provides a second portion of the first impedance in response to the first impedance selection signal and provides a second portion of the second impedance in response to the second impedance selection signal;
a third adjustable load circuit operably coupled to one tap of the second set of taps, wherein the third adjustable load circuit provides a third portion of the first impedance in response to the first impedance selection signal and provides a third portion of the second impedance in response to the second impedance selection signal; and
a fourth adjustable load circuit operably coupled to a second tap of the second set of taps, wherein the fourth adjustable load circuit provides a fourth portion of the first impedance in response to the first impedance selection signal and provides a fourth portion of the second impedance in response to the second impedance selection signal.

8. The radio front end of claim 1 further comprises:
a second adjustable load coupled to the first winding, wherein the second adjustable load provides a third impedance in response to the first impedance selection signal and provides a fourth impedance in response to the second impedance selection signal.

9. A radio frequency integrated circuit (RFIC) comprises:
a radio front end operably coupled to transceiver radio frequency (RF) signals;
a low noise amplifier operably coupled to the radio front end, wherein the low noise amplifier receives inbound RF signals from the radio front end, and wherein the low noise amplifier amplifies the inbound RF signals to produce amplified inbound RF signals;
down conversion module operably coupled to convert the amplified inbound RF signals into inbound baseband signals;
baseband processing module operably coupled to convert the inbound baseband signals into inbound data and to convert outbound data into outbound baseband signals in accordance with a wireless communications protocol;
up conversion module operably coupled to convert the outbound baseband signals into outbound RF signals; and
a power amplifier operably coupled to amplify the outbound RF signals to produce amplified outbound RF signals and to provide the amplified outbound RF signals to the radio front end, wherein the radio front end includes:
a transformer having a first winding and a second winding, wherein the first winding is operably coupled to an antenna and the second winding coupled to at least one of a power amplifier and a low noise amplifier; and
an adjustable load operably coupled to the second winding, wherein the adjustable load provides a first impedance based on a first impedance selection signal when the radio front end is in a transmit mode and provides a second impedance based on a second impedance selection signal when the radio front end is in a receive mode such that impedance at the first winding is substantially similar in the transmit mode and in the receive mode.

10. The RFIC of claim 9, wherein the adjustable load comprises:
a first variable capacitor circuit operably coupled from one node of the second winding to
a circuit ground, wherein the first variable capacitor circuit provides a first capacitance value in response to the first impedance selection signal and provides a second capacitance value in response to the second impedance selection signal; and
a second variable capacitor circuit operably coupled from another node of the second winding to the circuit ground, wherein the second variable capacitor circuit provides the first capacitance value in response to the first impedance selection signal and provides the second capacitance value in response to the second impedance selection signal.

11. The RFIC of claim 9, wherein the adjustable load comprises:
a variable capacitor circuit operably coupled from a first node of the second winding to a second node of the second winding, wherein the variable capacitor circuit provides a first capacitance value in response to the first impedance selection signal and provides a second capacitance value in response to the second impedance selection signal.

12. The RFIC of claim 9, wherein the adjustable load comprises:
a first variable inductor circuit operably coupled in series with one node of the second winding, wherein the first variable inductor circuit provides a first inductance value in response to the first impedance selection signal and provides a second inductance value in response to the second impedance selection signal; and
a second variable inductor circuit operably coupled in series with another node of the second winding, wherein the second variable inductor circuit provides the first inductance value in response to the first impedance selection signal and provides the second inductance value in response to the second impedance selection signal.

13. The RFIC of claim 9, wherein the adjustable load comprises:
a first variable inductance circuit operably coupled from one node of the second winding to a circuit ground, wherein the first variable inductance circuit provides a first inductance value in response to the first impedance selection signal and provides a second inductance value in response to the second impedance selection signal; and
a second variable inductor circuit operably coupled from another node of the second winding to the circuit ground, wherein the second variable inductor circuit provides the first inductance value in response to the first impedance selection signal and provides the second inductance value in response to the second impedance selection signal.

14. The RFIC of claim 9, wherein the radio front end further comprises:
determining the load impedance selection signal based on at least one of: impedance matching of load on single-ending winding, output power requirements, and receiver sensitivity.

15. The RFIC of claim 9, wherein the radio front end further comprises:
the second winding of the transformer includes a first set of taps and a second set of taps, wherein the first set of taps is coupled to a low noise amplifier and the second set of taps is coupled to a power amplifier; and
wherein the adjustable load includes:
a first adjustable load circuit operably coupled to one tap of the first set of taps, wherein the first adjustable load circuit provides a first portion of the first impedance in response to the first impedance selection signal and provides a first portion of the second impedance in response to the second impedance selection signal;
a second adjustable load circuit operably coupled to a second tap of the first set of taps, wherein the second adjustable load circuit provides a second portion of the first impedance in response to the first impedance selection signal and provides a second portion of the second impedance in response to the second impedance selection signal;
a third adjustable load circuit operably coupled to one tap of the second set of taps, wherein the third adjustable load circuit provides a third portion of the first impedance in response to the first impedance selection signal and provides a third portion of the second impedance in response to the second impedance selection signal; and
a fourth adjustable load circuit operably coupled to a second tap of the second set of taps, wherein the fourth adjustable load circuit provides a fourth portion of the first impedance in response to the first impedance selection signal and provides a fourth portion of the second impedance in response to the second impedance selection signal.

16. The RFIC of claim 9, wherein the radio front end further comprises:
a second adjustable load coupled to the first winding, wherein the second adjustable load provides a third impedance in response to the first impedance selection signal and provides a fourth impedance in response to the second impedance selection signal.

17. A radio front end comprises:
a power amplifier operable in a transmit mode;
a low noise amplifier operable in a receive mode;
a transformer having a first winding and a second winding, wherein the transformer is operably coupled to an antenna and operably coupled to the power amplifier and the low noise amplifier; and
at least one adjustable load operable to vary an impedance value at the second winding to compensate for a variable load between the transmit mode when the power amplifier is operable and a receive mode when the low noise amplifier is enabled, wherein the adjustable load is operable to provide a first impedance value in response to a first impedance selection signal when the radio front end is in a transmit mode and is operable to provide a second impedance value based on a second impedance selection signal when the radio front end is in a receive mode such that impedance on the second winding is substantially similar in the transmit mode and in the receive mode.

18. The radio front end of claim 17, wherein the adjustable load comprises:
a variable capacitor circuit operably coupled from at least one node of the first winding to at least a second node of the first winding, wherein the variable capacitor circuit is operable to provide a first capacitance value in response to the first impedance selection signal and a second capacitance value in response to the second impedance selection signal.

19. The radio front end of claim 17, wherein the adjustable load comprises:
a variable inductor circuit operably coupled in series with at least one node of the first winding, wherein the variable inductor circuit is operable to provide a first inductance value in response to the first impedance selection signal and a second inductance value in response to the second impedance selection signal.

20. The radio front end of claim 17, wherein the adjustable load comprises:
a variable inductance circuit operably coupled from at least one node of the first winding to a circuit ground, wherein the variable inductance circuit is operable to provide a first inductance value in response to the first impedance selection signal and a second inductance value in response to the second impedance selection signal.

21. The radio front end of claim 17, wherein the load impedance selection signal is determined based on at least one of: impedance matching of load on single-ending winding, output power requirements, and receiver sensitivity.

* * * * *